US006957275B1

(12) United States Patent
Sekiguchi

(10) Patent No.: US 6,957,275 B1
(45) Date of Patent: Oct. 18, 2005

(54) GATEWAY APPARATUS FOR CONTROLLING APPARATUSES ON HOME NETWORK

(75) Inventor: Kiyonori Sekiguchi, Machida (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 09/577,569

(22) Filed: May 25, 2000

(30) Foreign Application Priority Data

Jun. 3, 1999 (JP) ................................. 11-156064

(51) Int. Cl.$^7$ ...................... G06F 15/16; G06F 15/173; H04L 12/28
(52) U.S. Cl. ...................... 709/245; 709/225; 709/232; 709/236; 370/401
(58) Field of Search .............................. 709/223, 224, 709/225, 245, 246, 226, 202, 232, 236; 370/401, 370/352, 329, 466, 392; 725/82, 74; 345/717; 379/92, 25

(56) References Cited

U.S. PATENT DOCUMENTS

| | | | | | |
|---|---|---|---|---|---|
| 5,550,984 | A | * | 8/1996 | Gelb ........................... | 709/245 |
| 5,675,390 | A | * | 10/1997 | Schindler et al. ........... | 345/717 |
| 5,722,041 | A | * | 2/1998 | Freadman .................... | 725/82 |
| 5,841,764 | A | * | 11/1998 | Roderique et al. .......... | 370/310 |
| 5,937,041 | A | * | 8/1999 | Cardillo et al. .......... | 379/93.25 |
| 5,956,487 | A | | 9/1999 | Venkatraman et al. | |
| 5,995,669 | A | * | 11/1999 | Shingu et al. ............... | 382/237 |
| 6,005,861 | A | * | 12/1999 | Humpleman ................ | 370/352 |
| 6,006,272 | A | * | 12/1999 | Aravamudan et al. ...... | 709/245 |
| 6,038,233 | A | * | 3/2000 | Hamamoto et al. ......... | 370/401 |
| 6,138,150 | A | | 10/2000 | Nichols et al. | |
| 6,139,177 | A | | 10/2000 | Venkatraman et al. | |
| 6,157,950 | A | * | 12/2000 | Krishnan .................... | 709/223 |
| 6,198,479 | B1 | | 3/2001 | Humpleman et al. | |
| 6,285,671 | B1 | * | 9/2001 | Bossemeyer et al. ........ | 370/352 |
| 6,310,888 | B1 | * | 10/2001 | Hamlin ........................ | 370/466 |
| 6,324,178 | B1 | * | 11/2001 | Lo et al. ...................... | 370/392 |
| 6,359,892 | B1 | | 3/2002 | Szlam | |
| 6,378,000 | B1 | * | 4/2002 | Akatsu et al. ............... | 709/245 |
| 6,396,839 | B1 | * | 5/2002 | Ardalan et al. ............. | 370/401 |
| 6,434,627 | B1 | * | 8/2002 | Millet et al. ................. | 709/245 |
| 6,496,862 | B1 | * | 12/2002 | Akatsu et al. ............... | 709/224 |
| 6,501,742 | B1 | * | 12/2002 | Maeshima ................... | 370/315 |
| 6,523,696 | B1 | | 2/2003 | Saito et al. | |
| 6,526,581 | B1 | * | 2/2003 | Edson .......................... | 725/74 |
| 6,535,493 | B1 | * | 3/2003 | Lee et al. .................... | 370/329 |
| 6,580,950 | B1 | | 6/2003 | Johnson et al. | |
| 6,584,096 | B1 | * | 6/2003 | Allan .......................... | 370/352 |

(Continued)

FOREIGN PATENT DOCUMENTS

JP            9-215097          8/1997

(Continued)

OTHER PUBLICATIONS

An English Language abstract of JP 11-096131.

(Continued)

*Primary Examiner*—John Follansbee
*Assistant Examiner*—Kenny Lin
(74) *Attorney, Agent, or Firm*—Greenblum & Bernstein, P.L.C.

(57) ABSTRACT

The gateway apparatus has an IP address table that relates a plurality of apparatuses, each of which is one of components constructing a home network, to IP addresses respectively assigned to the apparatuses to store, a reception section that receives data with a destination indicative of one of the apparatuses constructing the home network, a recognition section that recognizes the apparatus with an IP address matching the IP address indicative of the destination contained in received data using the IP address table, and a distribution section that transmits the received data to the recognized apparatus.

13 Claims, 6 Drawing Sheets

U.S. PATENT DOCUMENTS

| | | | |
|---|---|---|---|
| 6,591,306 B1 * | 7/2003 | Redlich | 709/245 |
| 6,665,303 B1 * | 12/2003 | Saito et al. | 370/401 |
| 6,694,349 B1 * | 2/2004 | Zou | 709/202 |

FOREIGN PATENT DOCUMENTS

| | | |
|---|---|---|
| JP | 10126423 | 5/1998 |
| JP | 10308758 | 11/1998 |
| JP | 11096131 | 4/1999 |
| JP | 11187061 | 7/1999 |
| JP | 00-13786 | 1/2000 |
| JP | 1-178076 | 1/2000 |
| JP | 02-95246 | 10/2000 |

OTHER PUBLICATIONS

"Focus on Home Network", published in the periodical, Nikkei Communications, on Apr. 20, 1998, pp. 138-147 with English Language translation Summary Only.

English Language Abstract of JP-10-308758, Nov. 17, 1998.
English Language Abstract of JP-10-126423, May 15, 1998.
English Language Abstract of JP-11-187061, Jul. 9, 1999.
English Language Abstract of JP2002-95246, Oct. 20, 2000.
English Language Abstract of JP9-215097, Aug. 15, 1997.
English Language Abstract of JP 11-178076, Jan. 24, 2000.
English Language Abstract of JP 2000-13786, Jan. 24, 2000.
An English Language abstract of JP 11-096131, Apr. 9, 1999.
English Language Abstract of JP-10-308758.
English Language Abstract of JP-10-126423.
English Language Abstract of JP-11-187061.
English Language Abstract of JP2002-95246.
English Language Abstract of JP9-215097.
English Language Abstract of JP11-178076.
English Language Abstract of JP 2000-13786.

* cited by examiner

| IEEE1394 Node ID | IPv4/v6 IP ADDRESS | UID (UNIQUE ID) | APPARATUS ATTRIBUTE (PROPERTY) | APPLICATION TYPE |
|---|---|---|---|---|
| #1 | 133.185.245.7 | 123456 | CCD CAMERA | CAMERA AP |
| #2 | 133.185.245.8 | 123457 | DIGITAL TV | TV AP |
| #3 | 133.185.245.9 | 123458 | COLOR PRINTER | PRINTER DRIVER |
| #4 | 133.185.245.A | 123569 | SCANNER | SCANNER AP |
| #5 | 133.185.245.C | 12345A | REFRIGERATOR | REFRIGERATOR AP |
| #63 | 1080::8:800:200C::417A | 12346B | PERSONAL COMPUTER | NONE |

FIG. 3

GATEWAY APPARATUS FOR CONTROLLING APPARATUSES ON HOME NETWORK

BACKGROUND OF THE INVENTION

1. Field of the Invention

The present invention relates to a gateway apparatus connected to a home network connected to the internet, and more particularly, to a getaway apparatus enabling apparatuses on the home network that do not directly access to the internet to communicate, such as a digital camera and hot-water supply system, to be controlled through the internet from a remote place.

2. Description of the Related Art

In recent years, with techniques using the internet progressing remarkably, the internet has been widely spread in not only companies, but also in general homes. The internet is mainly used for e-mail, internet shopping, internet telephone and Web search in the homes.

Further it becomes familiar also to the homes to connect a plurality of personal computers and peripheral apparatuses as a network to share. This technique is achieved by blending and combining, for example, provision service of internet provider, technique of networks including Ethernet, internet protocol (IP), and OS of personal computer.

However, almost of products connected to a home network to be controlled do not access to the internet directly, and therefore do not have IP addresses. Hence it is impossible to transmit data using the internet from a remote place to the products connected to the home network to be controlled such as a digital camera and hot-water supply system. Further since such products require particular data conversion processing (for example, when data is output to a color printer, there is a possibility that conversion of RGB data format into CMY data format is required in some cases), it is difficult also in the view of data format to access to the products connected to the home network to be controlled using the internet.

SUMMARY OF THE INVENTION

In view of the foregoing, an object of the present invention is to provide a getaway apparatus enabling accesses to products, connected to a home network to be controlled, from a remote place using the internet. In order to achieve the above object, the gateway apparatus connected to the home network connected to the internet is provided with an IP (Internet Protocol) address management table relating the home products to be controlled to IP addresses respectively assigned to the products to store, and is designed to identify an IP address contained in received data received through the internet, recognize the product to be controlled related to the identified IP address based on the IP address management table, and transmit the received data to the product to be controlled.

In a first aspect of the present invention, an internet connection type SOHO gateway apparatus, which is connected to the home network connected to the internet, is provided with an IP (Internet Protocol) address management table that relates products to be controlled connected to the home network to IP addresses respectively assigned to the products to store, a section that identifies an IP address from internet data received through the internet, and a control section that recognizes a product to be controlled related to the IP address identified based on the IP address management table, and transmits the internet data to the recognized product to be controlled.

Therefore it is made possible to access to the products to be controlled, which are connected to the home network but do not have assigned IP addresses, from a remote place using the internet.

In a second aspect of the present invention, the section that identifies the IP address in the first aspect is designed to identify an IP address version of IPv4 or IPv6 in Internet Protocols.

Therefore it is made possible to correspond IPv4 to IPv6 as Internet Protocol versions.

In a third aspect of the present invention, the products to be controlled in the first aspect include produces that do not directly access to the internet to communicate, and the other products that directly access to the internet to communicate.

Therefore it becomes easy to control the products to be controlled connected to the same home network.

In a fourth aspect of the present invention, the internet connection type SOHO gateway apparatus is provided with an incorrect judgment section that excludes an incorrect use by performing password check to an access through the internet.

Therefore it is possible to prevent an unintended person from accessing to the product to be controlled connected to the home network.

In a fifth aspect of the present invention, the internet connection type SOHO gateway apparatus of the first aspect is connected to a personal computer so that the personal computer can register the IP address of the product to be controlled in the IP address management table. Thereby, it is possible to register the IP address in the IP address management table with ease, and to change and newly register the product to be controlled with ease.

In a sixth aspect of the present invention, the internet connection type SOHO gateway apparatus, which is connected to the home network connected to the internet, is provided with an IP address management table that relates products to be controlled connected to the home network to IP addresses respectively assigned to the products, and data indicative of conversion processing specific to the respective products, a section that identifies an IP address from internet data received through the internet, and a control section that recognizes a product to be controlled related to the IP address identified based on the IP address management table, and transmits the internet data to the recognized product to be controlled based on the conversion processing corresponding to the product to be controlled.

Therefore it is possible to recognize the product to be controlled and data conversion processing specific to the product from the IP address using a single IP address management table, and thereby it is possible to access to the product to be controlled connected to the home network with ease.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 3 is a construction diagram of an IP address management table in the gateway apparatus according to the above embodiment;

DETAILED DESCRIPTION OF THE PREFERRED EMBODIMENTS

One embodiment of the present invention will be described below specifically with reference to accompanying drawings.

Figure 1:
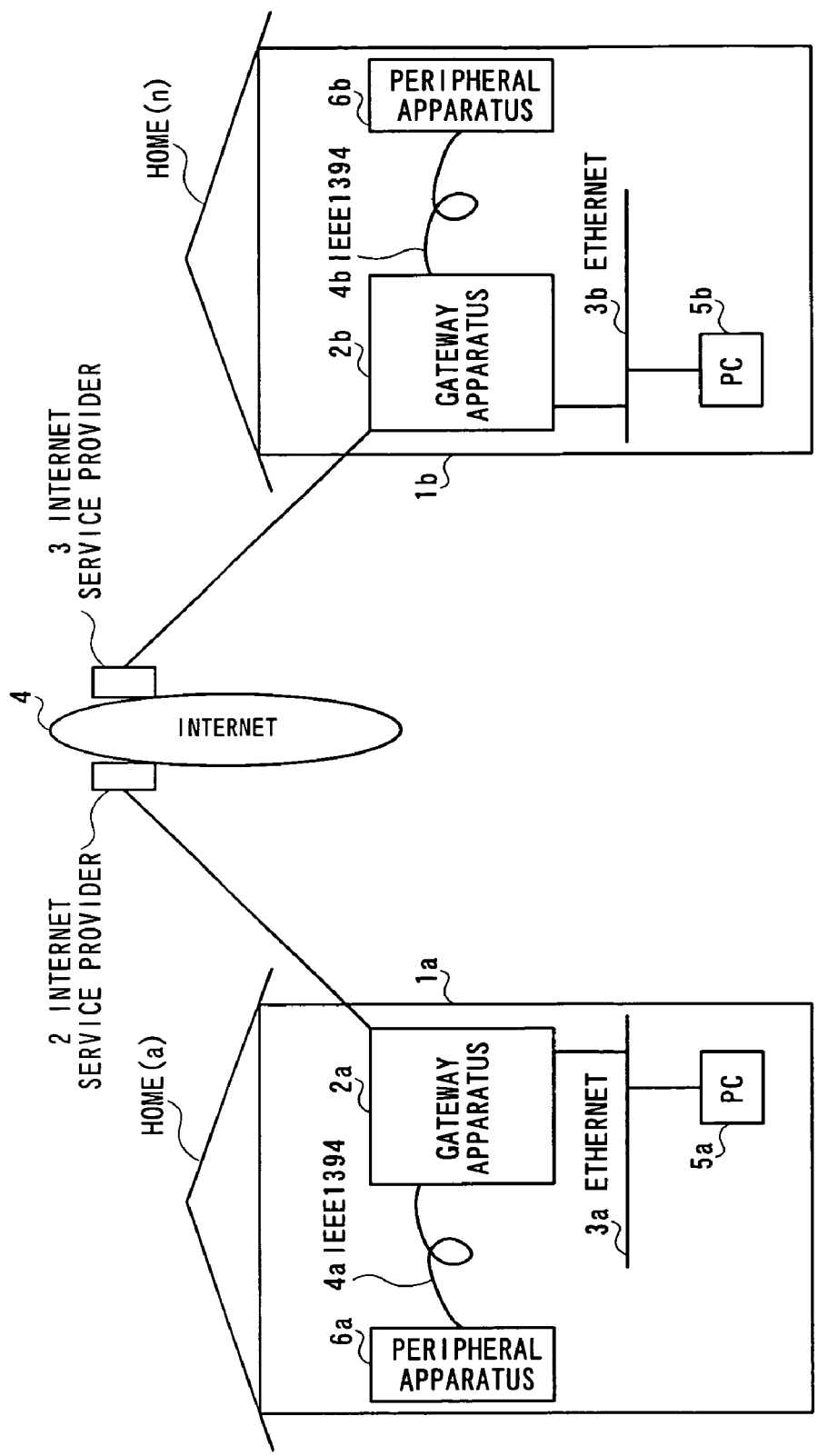
FIG. 1 is a system construction diagram illustrating a use mode of a gateway apparatus according to one embodiment of the present invention.

FIG. 1 is a diagram illustrating a use mode of a gateway apparatus according to the present invention. Home information networks 1a and 1b provided in homes (a) and (n) are constructed to be able to access to the internet 4 through internet service providers 2 and 3 with which each home has a contract, respectively. Home information network 1a is connected to internet service provider 2 by gateway apparatus 2a. Gateway apparatus 2a is connected to Ethernet 3a and a serial bus network conforming to IEEE 1394 (hereinafter referred to as IEEE 1394 network) 4a in parallel. It is assumed that personal computer 5a and the other peripheral apparatuses each with an IP address are connected to Ethernet 3a, and that various peripheral apparatuses 6a that cannot access to the internet directly are connected to IEEE 1394 network 4a. In addition, there is a peripheral apparatus that is connected to Ethernet 3a, but cannot access to the internet directly.

Thus, various information devices present in home (a) such as a personal computer, printer, scanner, television, digital camera, refrigerator, hot-water supply system, electric power meter, and tap water meter are combined as home information network 1a by gateway apparatus 2a, Ethernet 3a and IEEE 1394 network 4a. Home information network 1a contains peripheral apparatuses that cannot communicate through the internet, and gateway apparatus 2a enables such apparatuses to communicate through the internet.

Figure 2:
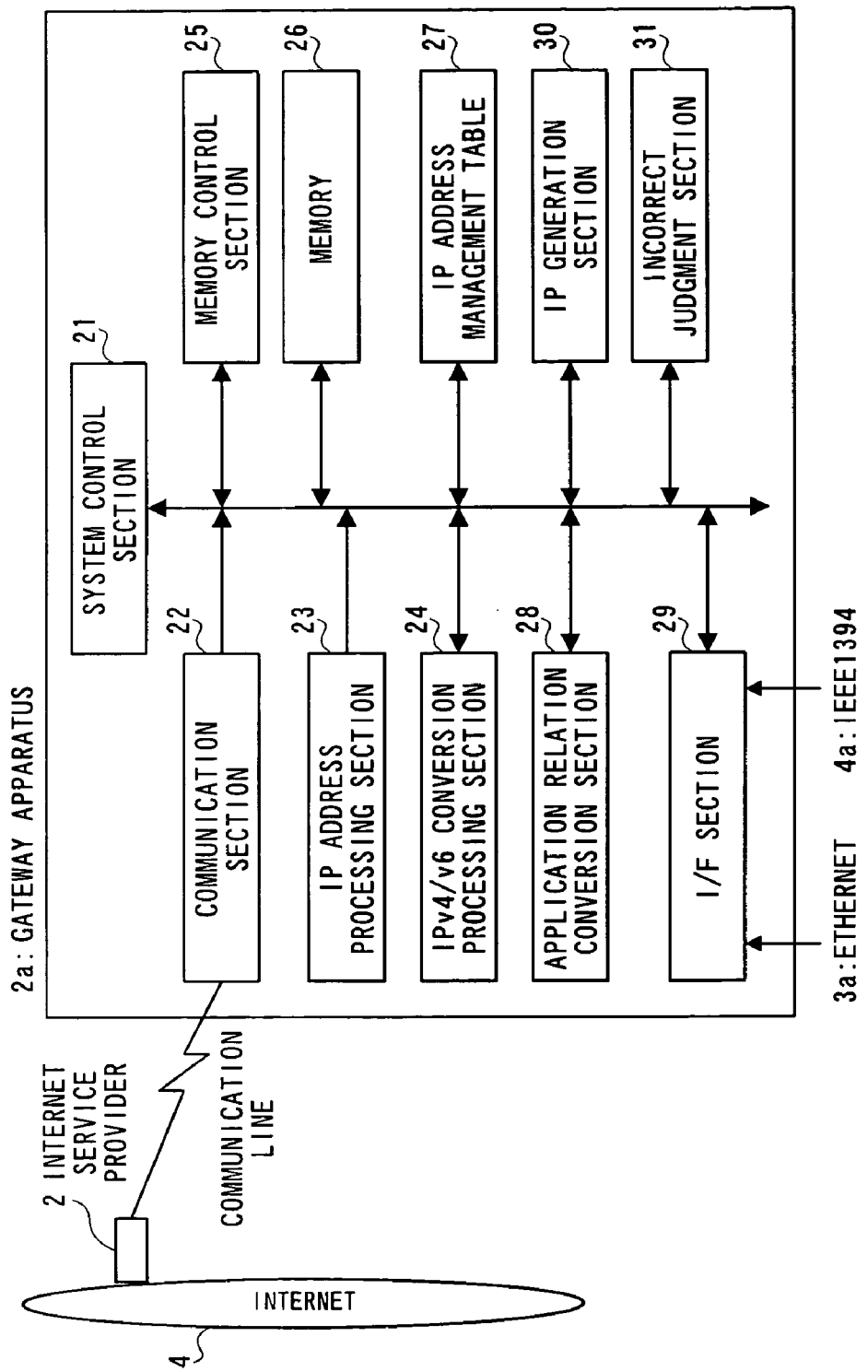
FIG. 2 is a functional block diagram of the gateway apparatus according to the above embodiment.

FIG. 2 illustrates functional blocks of gateway apparatus 2a. System control section 21, comprised of a CPU, controls the entire operation of gateway apparatus 2a. Communication section 22 performs communications according to the internet protocol through internet service provider 2 connected through a communication line. IP address processing section 23 identifies a type of the IP address (IPv4 or IPv6) contained in received data, or adds an IP address of a communication partner to datagram of transmission data, to provide to the communication section. IPv4/IPv6 conversion processing section 24 converts IPv6 of the IP address into the IPv4 address when necessary in the case where the type of IP address is IPv6. Memory control section 25 generates a write address and read address of shared memory 26, and performs write control and read control to shared memory 26. Shared memory 26 is used to temporarily store a datagram of data received from internet 4 and a datagram of data to be transmitted. IP address management table 27 manages the IP addresses acquired for all the information devices operating on home information network 1a.

In the present invention, IP addresses are acquired for general information devices each of which does not originally hold an IP address because the device does not access to the internet directly to communicate (hereinafter referred to as non-IP peripheral apparatus) such as a digital camera, scanner and printer.

As illustrated in FIG. 3, IP address management table 27 manages node ID 301 on IEEE 1394, unique ID 303, apparatus attribute 304 and application type 305 each related to IP address 302. Node ID 301 is an apparatus number assigned to each terminal on the IEEE 1394 network. On the IEEE 1394 network, the node ID is automatically assigned at the time of connecting to the network, while being newly assigned according to a predetermined algorithm when a bus reset occurs, and therefore there is a possibility that the node ID varies with time. Unique ID 303 is an identification number specific to an apparatus present on the IEEE 1394 network, and therefore does not vary. Apparatus attribute 304 is indicative of a function attribute of the apparatus present on the IEEE 1394 network. Specifically information indicative of a product such as a camera, television and printer, and a function such as CCD, digital and color, for example, CCD camera, digital television, scanner or color printer, is set as apparatus attribute 304. Set as application type 305 is a number of an application for executing conversion processing to adapt to an apparatus at a destination.

Application relation conversion processing section 28 starts an application that refers to IP address management table 27, and executes conversion processing for adapting an IP address to a non-IP peripheral apparatus when the non-IP peripheral apparatus is designated with the IP address. I/F section 29 operates as an interface with the networks (Ethernet 3a and IEEE 1394 network 4a) connected to gateway apparatus 2a. The non-IP peripheral apparatus is physically connected to an IEEE 1394 hub on IEEE 1394 network 4a connected to I/F section 29. IP generation section 30 is for use by, for example, the personal computer to register the IP address of the non-IP peripheral apparatus therein when data is transmitted to the non-peripheral apparatus. Incorrect judgment section 31 is to exclude an incorrect use by performing password check to an access through the internet.

In addition, home information network 1b in other HOME (n) is constructed in the same way as in home information network 1a as described above with gateway apparatus 2b illustrated in FIG. 2 connected to Ethernet 3b and IEEE 1394 network 4b. Specific system constructions of Ethernet 3b and IEEE 1394 networks 4b vary with home.

The case is next explained that communications are performed between home information network 1a and home information network 1b, each constructed as described above, through internet 4. The following explains the case that non-IP peripheral apparatus 6a on IEEE 1394 network 4a in HOME (a) transmits data to non-IP peripheral apparatus 6b on IEEE 1394 network 4b in HOME (n).

Figure 4:
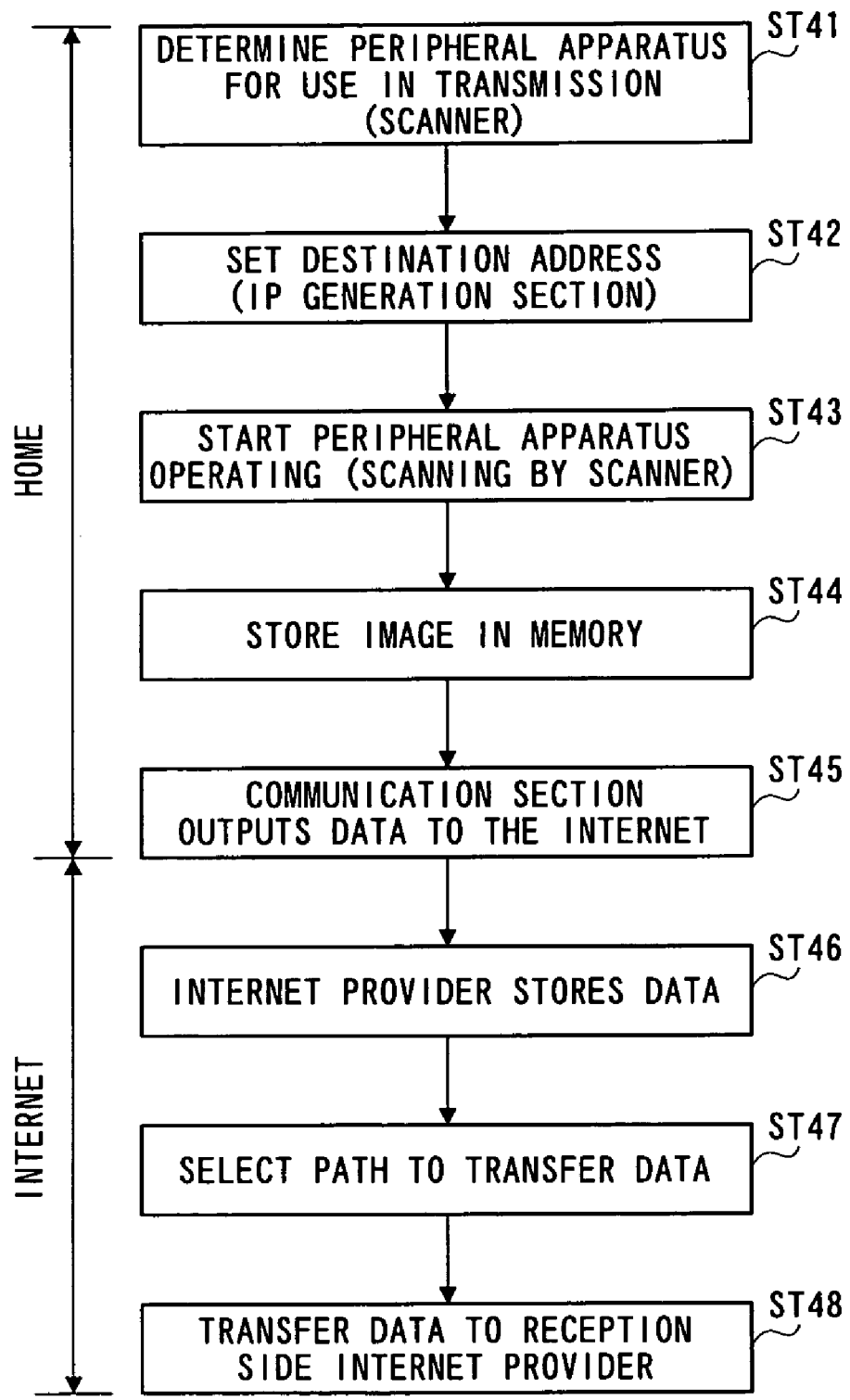
FIG. 4 is a flow diagram for transmission in the gateway apparatus according to the above embodiment.

FIG. 4 is a flowchart for use in transmitting data from non-IP peripheral apparatus 6a in HOME (a) to internet service provider 2. The first step is to determine a non-IP peripheral apparatus that transmits data to a communication partner through the internet (ST41). For example, assume the case that an image captured with a scanner (non-IP peripheral apparatus 6a) in HOME (a) is printed in a color printer (non-IP peripheral apparatus 6b) in HOME (n) through the internet. In this case, the scanner is determined as non-IP peripheral apparatus 6a at a transmission side.

The next step is to set an IP address of non-IP peripheral apparatus 6b at the communication partner (ST42). When non-IP peripheral 6a is determined as the transmission side, personal computer 5a sets the IP address of non-IP peripheral apparatus 6b at the communication partner in IP generation section 30. It is because non-IP peripheral apparatus 6a cannot execute processing based on the internet protocol.

Non-IP peripheral apparatus 6a starts operating to generate transmission data (ST43). In the case of this embodiment, the scanner captures an image of an original. The image data output from the scanner that captures the data is transferred to gateway apparatus 2a.

Gateway apparatus 2a stores the image data in shared memory 26 through a data bus in the apparatus from I/F section 29 (ST44). Memory control section 25 performs the control to write the image data in shared memory 26.

System control section 21 controls communication section 22 so that the section 22 starts TCP (Transfer Control Protocol), and capsulizes the image data stored in shared memory 26 in TCP packets to provide to IP address processing section 23 as a lower layer. IP address processing section 23 acquires an address of the communication partner from IP generation section 30, and provides TCP/IP datagram to communication section 22. Communication section 22 generates an internet frame with the TCP/IP datagram as the contents to transmit to internet service provider 2 (ST45).

Since getaway apparatus 2a thus intervenes to transmit the image data captured with the scanner as non-IP peripheral apparatus 6a to internet service provider 2, the scanner as non-IP peripheral apparatus 6a can transmit the image data over internet 4 without considering the internet protocol at all.

Internet service provider 2 temporarily stores the data received from gateway apparatus 2a (ST46). The data is transferred to internet 4 based on the IP address of the communication partner from provider 2 (ST47), and then transferred to internet service provider 3 with which HOME (n), as a reception side, has a contract (ST48).

Figure 5:
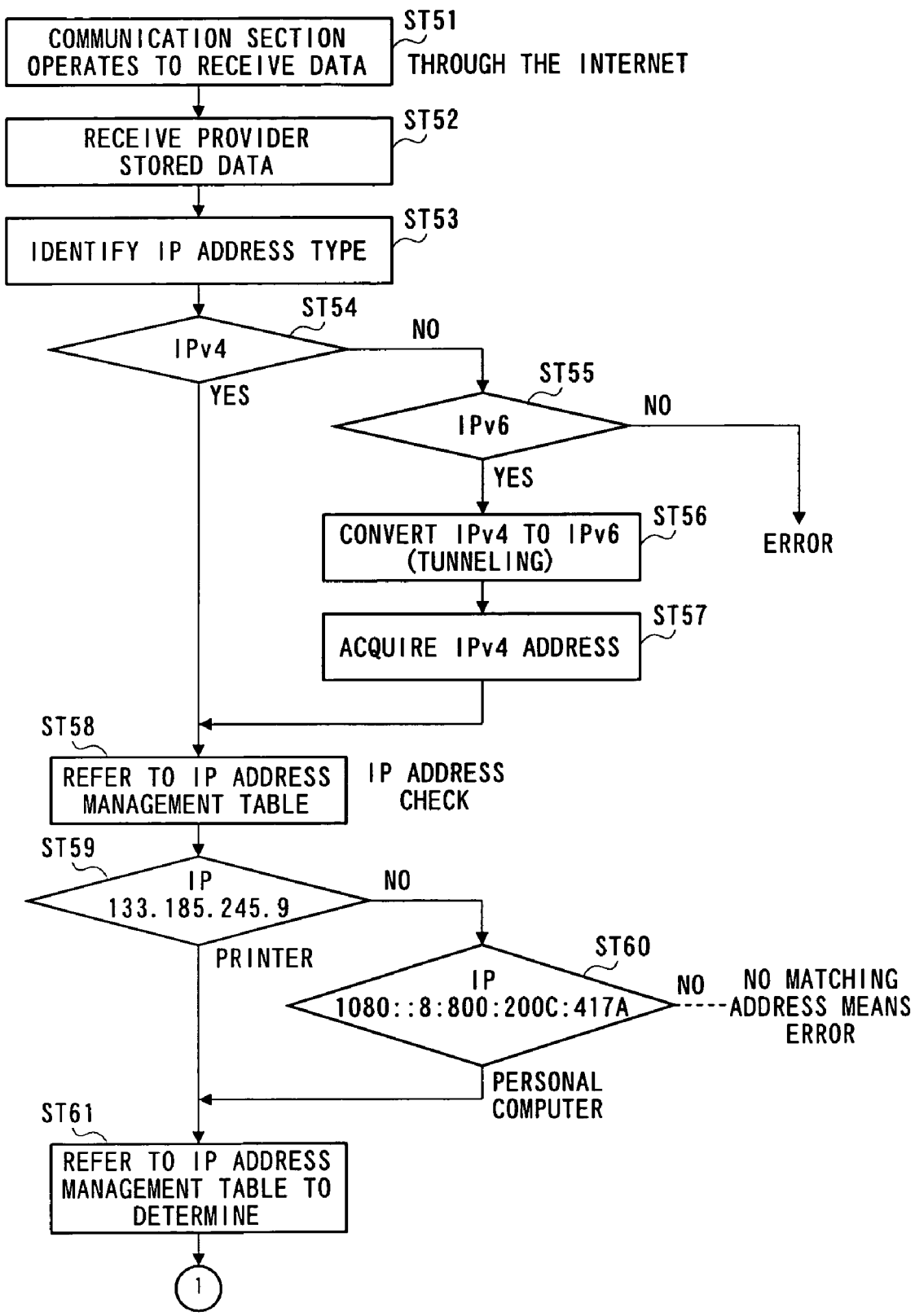
FIG. 5 is a flow diagram of a first half of a flowchart for reception in the gateway apparatus according to the above embodiment.
Figure 6:
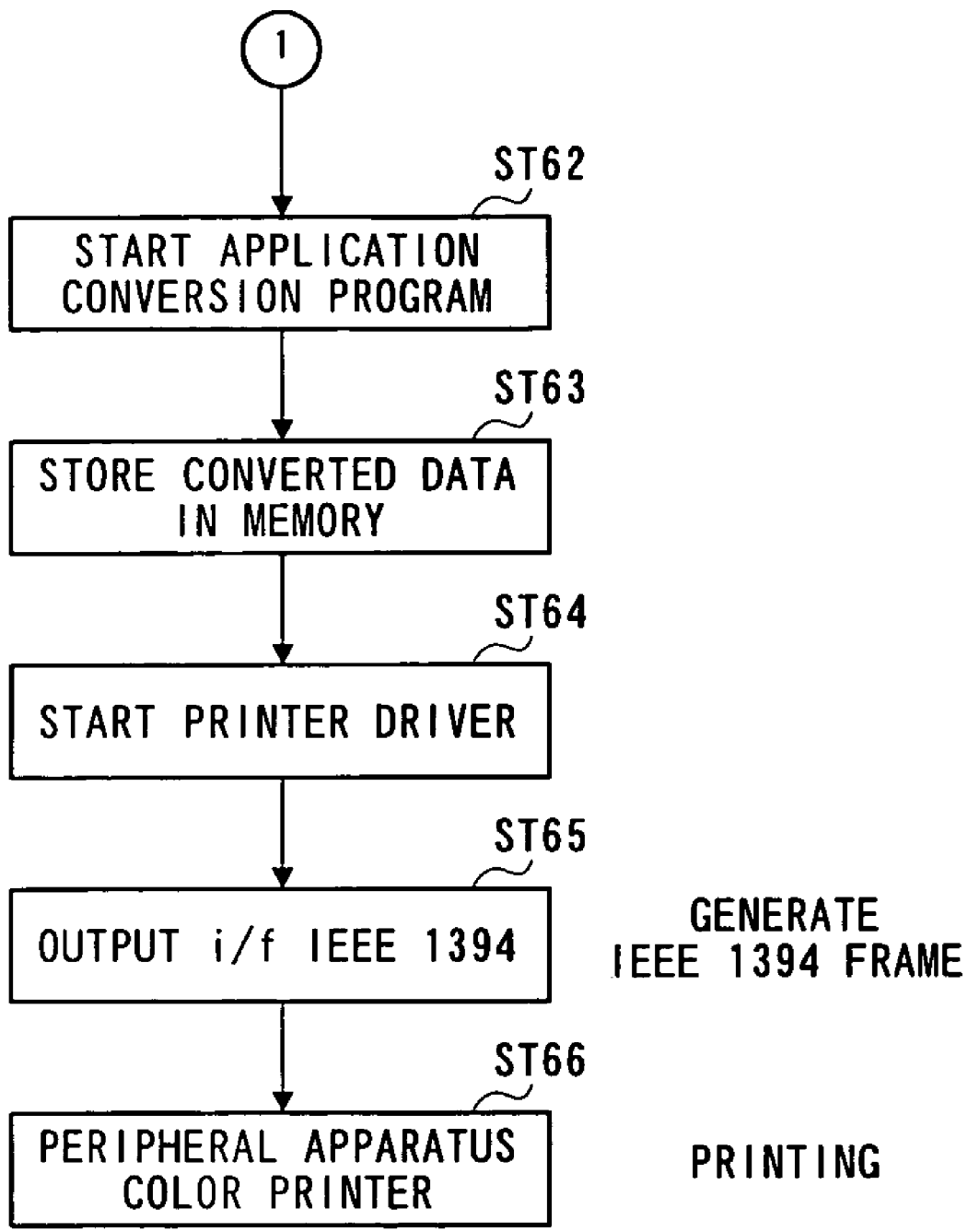
FIG. 6 is a flow diagram of a latter half of the flowchart for reception in the gateway apparatus according to the above embodiment.

FIGS. 5 and 6 illustrate flowcharts for gateway apparatus 2b in HOME (n) as the reception side to provide the data received from internet service provider 3 to non-IP peripheral apparatus 6b, and complete the processing.

In gateway apparatus 2b in HOME (n) as the reception side, communication section 22 operates to access to internet service provider 3, and receives the data addressed to HOME (n) (ST51 and ST52). Specifically the section 22 receives as the data addressed to HOME (n) data that has as a destination address an IP address matching the IP address registered in IP address management table 27 contained in gateway apparatus 2b.

IP address processing section 23 checks the IP address of the received data received by communication section 22 to identify the type of the IP address (ST53). Specifically the section 23 identifies whether the IP address is IPv4 or IPv6.

When it is judged at ST53 that the IPv6 address designates an IPv4 peripheral apparatus, the IPv6 address is returned to an IPv4 address by the IP tunneling technique (ST56 and ST57). It is assumed that the IP address conversion algorithm conforms to RFC standard of IETF.

Next, system control section 21 specifies an information apparatus that holds the IP address matching the IP address of the received data by referring to IP address management table 27 (ST58, ST59 and ST60). For example, when the IP address is 133.185.245.9, the section 21 recognizes that the destination is a printer on the IEEE 1394 network by referring to IP address 302 and the contents of IP address management table 27.

System control section 21 judges the apparatus attribute and application type of the information apparatus specified by the IP address using IP address management table 27 (ST61). Further when the destination is an information apparatus on the IEEE 1394 network, the section 21 acquires the node ID at the same time.

There is a possibility that some received data cannot be processed when transferred to the information apparatus as the destination with no processing provided thereon. Herein, the datagram stored in shared memory 26 is scanner data transmitted through internet 4, and cannot be directly output to a printer. Accordingly it is necessary to convert the data transmitted from the transmission side into data that an apparatus at the reception side can process. In this embodiment, the gateway apparatus is provided with applications for each information apparatus that convert the received data into data that the respective information apparatus can interpret, and the application numbers are set in IP address management table 27.

Application relation conversion processing section 28 acquires the application number from IP address management table 27, and starts the conversion program with the application number to execute the conversion processing. Thereby, RGB data of the scanner is converted into color space with YMCK. The data converted with the conversion program is stored in shared memory 26 (ST63).

Next, in an example of this embodiment, a printer driver is started to convert the stored data into printer data (ST64). To transmit the converted data stored in shared memory 26, a frame conforming to IEEE 1394 is generated using the node ID acquired at step ST 61 as the destination (ST65). Then the data is transferred to the printer on IEEE 1394 network 4b (ST66).

In addition, on the IEEE 1394 network, the node ID is automatically re-assigned when a plug and play function of the IEEE 1394 operates, and the re-assigned node ID is different from the previous one. However, in this case, the communication partner as the destination is recognized successively by referring to the unique ID in IP address management table 27.

Thus, according to this embodiment, node ID 301, apparatus attribute 304, and application type 305 are managed based on the IP address of the non-IP peripheral apparatus in IP address management table 27. Therefore it is possible to obtain service provision such as information retrieval, information collection and e-mail through the internet from the non-IP peripheral apparatus that is not able to connect to the internet directly conventionally. It is further possible to transfer data between different home electric appliances using respective applications on respective home networks connected through internet 4.

As can be apparent from the above explanation, according to the present invention, the gateway apparatus connected to the home network connected to the internet is provided with the IP address management table relating the home products to be controlled to IP (Internet Protocol) addresses respectively assigned to the products, identifies an IP address contained in internet data received through the internet, recognizes the product to be controlled related to the identified IP address based on the IP address management table, and transmits the internet data to the product to be controlled. Therefore it is possible to access to the product to be controlled, connected to the home network, to which an IP address is not assigned, from a remote place using the internet.

In addition, while the above explanation describes the home network, the present invention is not limited to a network inside the home, and is applicable to the network inside an office similarly. The present invention is also applicable similarly to the case where the gateway apparatus accesses to the internet without using service provider 2, and communicates with an apparatus on the other network.

The present invention is not limited to the above described embodiments, and various variations and modifications may be possible without departing from the scope of the present invention.

This application is based on the Japanese Patent Application No. HEI11-156064 filed on Jun. 3, 1999, entire content of which is expressly incorporated by reference herein.

What is claimed is:

1. A gateway apparatus capable of connecting to the Internet, the gateway apparatus being one of a plurality of components in a home network, the home network including a transmitting apparatus not having an IP address connected to the gateway apparatus and an input device connected to the gateway apparatus, the gateway apparatus comprising:
a communicator that is configured to communicate with a receiving apparatus through the Internet;
a controller that is configured to receive data from the transmitting apparatus not having the IP address, to configure the data for Internet transmission, to generate an Internet-frame based on the data received from the transmitting apparatus not having the IP address and based on an IP address which is assigned to a receiving apparatus, the IP address assigned to the receiving apparatus being input by the input device, the transmitting apparatus not having a capability of inputting the IP address, the data received from the transmitting apparatus not including a destination address of the receiving apparatus, and to send the Internet-frame to the receiving apparatus through the communicator.

2. The gateway apparatus according to claim 1, wherein the input device is a personal computer.

3. The gateway apparatus according to claim 1, wherein the controller configures the data into TCP packets for Internet transmission and generates an Internet-frame based on the TCP packets.

4. The gateway apparatus according to claim 1, wherein the transmitting apparatus not provided with an IP address is at least one of a printer, a scanner, a television, a digital camera, a refrigerator, a hot-water supply, an electric power meter and a water meter.

5. The gateway apparatus according to claim 1, wherein the input device is a device external of the transmitting apparatus not having the IP address.

6. A gateway apparatus capable of connecting to the Internet, the apparatus being one of a plurality of components in a home network, the apparatus comprising:
an interface that is configured to connect with a receiving apparatus not having an IP address;
a communicator that is configured to communicate with a transmitting apparatus through the Internet;
a memory that is configured to store an IP address corresponding to the receiving apparatus not having the IP address and an application program which converts received data into data which the receiving apparatus not having the IP address can interpret, the application program being related to a property of the receiving apparatus not having the IP address, the property indicating at least a product type of the receiving apparatus not having the IP address; and
a controller that is configured to receive an Internet-frame including the IP address corresponding to the receiving apparatus not having the IP address and data from the transmitting apparatus, to search the memory for the receiving apparatus not having the IP address to which the data is to be transferred, based on the corresponding IP address included in the Internet-frame, and to transfer the data to the receiving apparatus not having the IP address,
wherein said controller converts the received data into data which the receiving apparatus not having the IP address can interpret, by utilizing the application program in the memory, when the received data is data which the receiving apparatus not having the IP address can not interpret.

7. A gateway apparatus according to claim 6, wherein the data from the receiving apparatus is configured into TCP packets.

8. A gateway apparatus according to claim 6, wherein the receiving apparatus not having an IP address is at least one of a printer, a scanner, a television, a digital camera, a refrigerator, a hot-water supply, an electric power meter and a water meter.

9. A method for transmitting data from a transmitting apparatus not having an IP address in a home network through the Internet to a receiving apparatus, the method comprising:
receiving data from the transmitting apparatus not having the IP address;
configuring the data for Internet transmission;
generating an Internet-frame based on the data received from the transmitting apparatus not having the IP address and based on an IP address which is assigned to a receiving apparatus, the IP address assigned to the receiving apparatus being input by an input device, the transmitting apparatus having not a capability of inputting the IP address, the data received from the transmitting apparatus not including a destination address of the receiving apparatus; and
sending the Internet-frame to the receiving apparatus.

10. The method for transmitting data according to claim 9, the IP address assigned to the receiving apparatus is input by a device external of the transmitting apparatus not having the IP address.

11. A method for receiving data from a transmitting apparatus through the Internet, a memory storing an IP address corresponding to a receiving apparatus not having the IP address and an application program which converts received data into data which the receiving apparatus not having the IP address can interpret, the method comprising:
receiving an Internet-frame including the IP address corresponding to the receiving apparatus not having the IP address and data from the transmitting apparatus;
searching the memory for the receiving apparatus not having the IP address to which the data is to be transferred, based on the corresponding IP address included in the Internet-frame;
converting the received data into data which the receiving apparatus not having the IP address can interpret, by utilizing the application program in the memory, when the received data is data which the receiving apparatus not having the IP address can not interpret, the application program being related to a property of the receiving apparatus not having the IP address, the property indicating at least a product type of the receiving apparatus not having the IP address; and transferring the data to the receiving apparatus not having the IP address.

12. A gateway apparatus capable of connecting to the Internet, the apparatus being one of a plurality of components in a home network, the apparatus comprising:

an interface that is configured to connect with a receiving apparatus not having an IP address;

a communicator that is configured to communicate with a transmitting apparatus through the Internet;

a memory that is configured to store an IP address corresponding to the receiving apparatus not having the IP address and an application program which converts received data into data which the receiving apparatus not having the IP address can interpret, the application program being related to a property of the receiving apparatus not having the IP address, the property indicating at least a product type of the receiving apparatus not having the IP address; and a controller that is configured to receive an Internet-frame including the IP address corresponding to the receiving apparatus not having the IP address and data from the transmitting apparatus, to search the memory for the receiving apparatus not having the IP address to which the data is to be transferred, based on the corresponding IP address included in the Internet-frame, and to transfer the data to the receiving apparatus not having the IP address, wherein said controller converts the received data into data which the receiving apparatus not having the IP address can interpret, by utilizing the application program in the memory, when the received data is data which the receiving apparatus not having the IP address can not interpret; and wherein the transmitting apparatus is a scanner dealing with RGB data, the receiving apparatus not having the IP address is a printer dealing with YMCK data, and the application program stored in the memory is a program which converts RGB data received from the scanner into YMCK data which the printer can interpret.

13. A method for receiving data from a transmitting apparatus through the Internet, a memory storing an IP address corresponding to a receiving apparatus not having the IP address and an application program which converts received data into data which the receiving apparatus not having the IP address can interpret, the method comprising:

receiving an Internet-frame including the IP address corresponding to the receiving apparatus not having the IP address and data from the transmitting apparatus;

searching the memory for the receiving apparatus not having the IP address to which the data is to be transferred, based on the corresponding IP address included in the Internet-frame;

converting the received data into data which the receiving apparatus not having the IP address can interpret, by utilizing the application program in the memory, when the received data is data which the receiving apparatus not having the IP address can not interpret, the application program being related to a property of the receiving apparatus not having the IP address, the property indicating at least a product type of the receiving apparatus not having the IP address; and transferring the data to the receiving apparatus not having the IP address; wherein, the transmitting apparatus is a scanner dealing with RGB data, the receiving apparatus not having the IP address is a printer dealing with YMCK data, and the application program stored in the memory is a program which converts RGB data received from the scanner into YMCK data which the printer can interpret.

* * * * *